United States Patent
You (10) Patent No.: US 9,049,086 B2
(45) Date of Patent: Jun. 2, 2015

(54) APPARATUS AND METHOD FOR PERFORMING AUTOMATIC FREQUENCY CONTROL

(71) Applicant: Electronics & Telecommunications Research Institute, Daejeon (KR)

(72) Inventor: Duk Hyun You, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 20 days.

(21) Appl. No.: 13/733,463

(22) Filed: Jan. 3, 2013

(65) Prior Publication Data
US 2013/0177111 A1    Jul. 11, 2013

(30) Foreign Application Priority Data

Jan. 5, 2012  (KR) ......................... 10-2012-0001654

(51) Int. Cl.
*H04L 27/06* (2006.01)
*H04L 27/26* (2006.01)

(52) U.S. Cl.
CPC ........ *H04L 27/2647* (2013.01); *H04L 27/2657* (2013.01); *H04L 27/2686* (2013.01)

(58) Field of Classification Search
USPC ........................................................ 375/344
See application file for complete search history.

(56) References Cited

U.S. PATENT DOCUMENTS

| | | | | |
|---|---|---|---|---|
| 4,751,576 | A * | 6/1988 | Mehrgardt | 348/558 |
| 7,443,826 | B1 | 10/2008 | Atarius et al. | |
| 2004/0066737 | A1 | 4/2004 | Sakaishi | |
| 2004/0247063 | A1 * | 12/2004 | Piirainen | 375/350 |
| 2006/0234737 | A1 * | 10/2006 | Neumann et al. | 455/502 |
| 2009/0225743 | A1 * | 9/2009 | Nicholls et al. | 370/350 |
| 2012/0288037 | A1 * | 11/2012 | Patel et al. | 375/340 |

FOREIGN PATENT DOCUMENTS

JP    WO02/099988    12/2002
KR    10-2006-0059042    6/2006

* cited by examiner

*Primary Examiner* — Erin File
(74) *Attorney, Agent, or Firm* — Nelson Mullins Riley & Scarborough LLP

(57) ABSTRACT

Disclosed are a device and method for automatically controlling frequency. The automatic frequency control device includes a frequency error detection unit configured to obtain a frequency error detection value of a received carrier, a frequency error prediction unit configured to calculate a first frequency error prediction value on the basis of the frequency error detection value when the frequency error detection value satisfies a preset first criterion, and a frequency error compensation unit configured to calculate a second frequency error prediction value by correcting the first frequency error prediction value, and compensate for a frequency of the carrier on the basis of the second frequency error prediction value when a frequency change rate of the received carrier satisfies a preset second criterion. Therefore, overshoot and undershoot effects are minimized, and thus frequency control may be correctly performed.

15 Claims, 4 Drawing Sheets

APPARATUS AND METHOD FOR PERFORMING AUTOMATIC FREQUENCY CONTROL

CLAIM FOR PRIORITY

This application claims priority to Korean Patent Application No. 10-2012-0001654 filed on Jan. 5, 2012 in the Korean Intellectual Property Office (KIPO), the entire contents of which are hereby incorporated by reference.

BACKGROUND

1. Technical Field

Example embodiments of the present invention relate in general to mobile communication, and more specifically, to an apparatus and method for automatically controlling a frequency in a mobile communication system.

2. Related Art

Recently, an orthogonal frequency division multiple access (OFDMA) scheme or a single carrier frequency division multiple access (SC-FDMA) scheme has been adopted for various mobile communication technologies. For example, IEEE 802.16, 802.20 and wireless broadband (WiBro) systems adopt the OFDMA scheme, and a long term evolution system (LTE) of 3rd generation partnership project (3GPP) adopts the OFDMA scheme for a downlink and the SC-FDMA scheme for an uplink.

In the case of using the OFDMA and SC-FDMA schemes, when a carrier frequency of a base station transmitting a carrier does not exactly match that of a terminal receiving the carrier, i.e., when there occurs a frequency error, noise occurs in every packet transmitted, causing degradation of performance. In order to remove the noise, according to a typical technology, a reference signal such as a pilot signal is transmitted to a particular resource space formed with a particular frequency and particular time so as to measure distortion of a channel, and this distortion is compensated.

According to a typical method for removing a frequency error, a carrier frequency difference between a base station transmitting a carrier and a terminal receiving the carrier is detected by measuring distortion of a channel, and a frequency of the carrier is compensated for as much as the carrier frequency difference. After the carrier frequency is updated, it is maintained until next update. Thus, this method may be used when a user moves at low speed, a data rate is low, or a power resource is not limited, i.e., when there is no limitation in retransmission of data.

However, when a user moves at high speed, and thus a carrier frequency difference is rapidly changed, the above-described method is limited in removing a frequency error as a Doppler shift effect cannot be considered.

According to another method for removing a frequency error, after a carrier frequency is once updated, a frequency error is predicted by using a previously updated value until next update, and the predicted frequency error is compensated for, thereby removing the frequency error even when the carrier frequency is rapidly changed.

However, according to this method, an overshoot or undershoot phenomenon occurs when a high rate of carrier frequency variation is changed into a low rate. Thus, this method is limited in correcting a frequency error.

SUMMARY

Accordingly, example embodiments of the present invention are provided to substantially obviate one or more problems due to limitations and disadvantages of the related art.

Example embodiments of the present invention provide an automatic frequency control device capable of reducing an error of a packet by compensating for a frequency error of a carrier.

Example embodiments of the present invention also provide an automatic frequency control method capable of reducing an error of a packet by compensating for a frequency error of a carrier.

In some example embodiments, an automatic frequency control device includes a frequency error detection unit configured to obtain frequency error detection values of a received carrier, a frequency error prediction unit configured to calculate a first frequency error prediction value on the basis of the frequency error detection values when the frequency error detection values satisfy a preset first criterion, and a frequency error compensation unit configured to calculate a second frequency error prediction value by correcting the first frequency error prediction value and compensate for a frequency of the carrier on the basis of the second frequency error prediction value when the frequency change rate of the received carrier satisfies a preset second criterion.

The frequency error prediction unit may compare the number of variables of an algebraic function with the number of frequency error detection values in the case where a predefined function for calculating the first frequency error prediction value is the algebraic function, or may compare a preset number with the number of frequency error detection values in the case where the predefined function is a transcendental function to thereby calculate the first frequency error prediction value.

The frequency error prediction unit may calculate the first frequency error prediction value by using the predefined function on the basis of the frequency error detection values when the number of frequency error detection values is equal to or greater than the number of variables or the preset number.

The frequency error prediction unit may calculate the first frequency error prediction value by using an interpolation method on the basis of the frequency error detection values when the number of frequency error detection values is smaller than the number of variables or the preset number, and the frequency error compensation unit may compensate for the frequency of the carrier on the basis of the first frequency error prediction value calculated by using the interpolation method.

The frequency error compensation unit may classify the frequency change rate of the received carrier into a first section in which the frequency change rate is equal to or greater than a preset reference value, and a second section in which the frequency change rate is smaller than the preset reference value, wherein, when the frequency change rate of the received carrier is changed from the first section to the second section, the preset second criterion may be satisfied.

When the preset second criterion is satisfied, the frequency error compensation unit may calculate the second frequency error prediction value by correcting the first frequency error prediction value calculated by using the predefined function, and may compensate for the frequency of the carrier on the basis of the calculated second frequency error prediction value.

When the preset second criterion is not satisfied, the frequency error compensation unit may compensate for the frequency of the carrier on the basis of the first frequency error prediction value calculated by using the predefined function.

The frequency error compensation unit may calculate the second frequency error prediction value by weighting the first error prediction value, or may calculate the second frequency error prediction value by taking an average of the frequency error detection values and the first frequency error prediction value.

In other example embodiments, an automatic frequency control method using an automatic frequency control device includes obtaining frequency error detection values of a received carrier, calculating a first frequency error prediction value on the basis of the frequency error detection values when the frequency error detection values satisfy a preset first criterion, and calculating a second frequency error prediction value by correcting the first frequency error prediction value, and compensating for a frequency of the carrier on the basis of the second frequency error prediction value when the frequency change rate of the received carrier satisfies a preset second criterion.

The calculating of the first frequency error prediction value may include comparing the number of variables of an algebraic function with the number of frequency error detection values in the case where a predefined function for calculating the first frequency error prediction value is the algebraic function, or comparing a preset number with the number of frequency error detection values in the case where the predefined function is a transcendental function to thereby calculate the first frequency error prediction value.

The calculating of the first frequency error prediction value may include calculating the first frequency error prediction value by using the predefined function on the basis of the frequency error detection values when the number of frequency error detection values is equal to or greater than the number of variables or the preset number, and the calculating of the second frequency error prediction value and the compensating for the frequency of the carrier may include calculating the second frequency error prediction value by correcting the first frequency error prediction value calculated by using the predefined function, and compensating for the frequency of the carrier on the basis of the calculated second frequency error prediction value.

The calculating of the first frequency error prediction value may include calculating the first frequency error prediction value by using an interpolation method on the basis of the frequency error detection values when the number of frequency error detection values is smaller than the number of variables or the preset number, and the calculating of the second frequency error prediction value and the compensating for the frequency of the carrier may include compensating for the frequency of the carrier on the basis of the first frequency error prediction value calculated by using the interpolation method.

The calculating of the second frequency error prediction value and the compensating for the frequency of the carrier may include classifying the frequency change rate of the received carrier into a first section in which the frequency change rate is equal to or greater than a preset reference value, and a second section in which the frequency change rate is smaller than the preset reference value, wherein, when the frequency change rate of the received carrier is changed from the first section to the second section, the preset second criterion is satisfied.

The calculating of the second frequency error prediction value and the compensating for the frequency of the carrier may include compensating for the frequency of the carrier on the basis of the first frequency error prediction value calculated by using the predefined function when the preset second criterion is not satisfied.

The calculating of the second frequency error prediction value and the compensating for the frequency of the carrier may include calculating the second frequency error prediction value by weighting the first error prediction value, or calculating the second frequency error prediction value by taking an average of the frequency error detection values and the first frequency error prediction value.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

While the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, example embodiments of the present invention will be described in detail with reference to the accompanying drawings.

Figure 1:
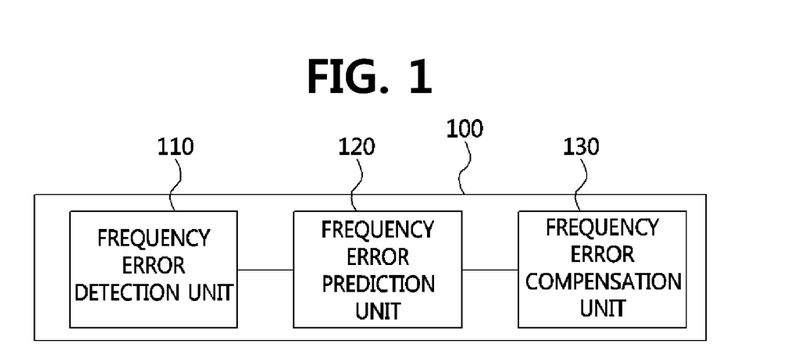
FIG. 1 is a block diagram illustrating an automatic frequency control device according to an example embodiment of the present invention.

FIG. 1 is a block diagram illustrating an automatic frequency control device according to an example embodiment of the present invention.

Referring to FIG. 1, an automatic frequency control device 100 may compensate for a carrier frequency error between a transmitter transmitting a carrier and a receiver receiving the carrier.

For example, in a mobile communication system, the transmitter transmitting a carrier may be a base station that transmits the carrier to various mobile terminals, and the receiver receiving a carrier may be the various mobile terminals that receive the carrier from the base station.

Or, the transmitter transmitting a carrier may be various mobile terminals that transmit a carrier including data to a base station, and the receiver receiving a carrier may be the base station that receives the carrier from the various mobile terminals.

The automatic frequency control device 100 may include a frequency error detection unit 110, a frequency error prediction unit 120, and a frequency error compensation unit 130.

The frequency error detection unit 110 may obtain a frequency error detection value of a received carrier. The obtained frequency error detection value may be stored in the frequency error detection unit 110 or may be stored in an additional storage unit (not illustrated).

More specifically, the frequency error detection unit 100 may compare a frequency of a carrier periodically or aperiodically measured with that of a carrier transmitted from a transmitter to obtain the frequency error detection value of the received carrier.

When the frequency error detection value satisfies a preset first criterion, the frequency error prediction unit 120 may calculate a first frequency error prediction value on the basis of the frequency error detection value.

More specifically, in order to calculate the first frequency error prediction value, the frequency error prediction unit 120 may compare the number of variables of an algebraic function with the number of frequency error detection values in the case where a predefined function is the algebraic function, or may compare a preset number with the number of frequency error detection values in the case where the predefined function is a transcendental function.

Further, in the case where the number of frequency error detection values is equal to or greater than the number of variables of the algebraic function or the preset number of the transcendental function, i.e., in the case where the preset first criterion is satisfied, the frequency error prediction unit 120 may calculate the first frequency error prediction value by using the predefined function on the basis of the frequency error detection value. Or, in the case where the number of frequency error detection values is smaller than the number of variables of the algebraic function or the preset number of the transcendental function, i.e., in the case where the preset first criterion is not satisfied, the frequency error prediction unit 120 may calculate the first frequency error prediction value by using an interpolation method, e.g., a low-order linear interpolation method, on the basis of the frequency error detection value.

For example, in the case where the predefined function is an algebraic function of $y=ax^2+bx+c$, the number of variables (i.e., 'a', 'b', and 'c' in this example) is three. In this case, when the number of frequency error detection values is three or more, the first frequency error prediction value may be calculated by using the algebraic function with the frequency error detection values. However, when the number of frequency error detection values is two, the first frequency error prediction value cannot be calculated by using the algebraic function. Therefore, the interpolation method, e.g., the low-order linear interpolation method, may be used to calculate the first frequency error prediction value.

Further, in the case where the predefined function is a transcendental function such as $\cos(x)$, the preset number is compared with the number of frequency error detection values to calculate the frequency error prediction value by using the transcendental function when the number of frequency error detection values is equal to or greater than the preset number. Or, when the number of frequency error detection values is smaller than the preset number, the first frequency error prediction value may be calculated by using the interpolation method. Here, the preset number may be variously set according to a using environment.

When a frequency change rate of the received carrier satisfies a preset second criterion, the frequency error compensation unit 130 may calculate a second frequency error prediction value by correcting the first frequency value prediction value and may compensate for the frequency of the carrier on the basis of the second frequency error prediction value.

More specifically, the frequency error compensation unit 130 may divide the frequency change rate into a first section in which the frequency change rate is equal to or greater than a preset reference value (see FIG. 3), and a second section in which the frequency change rate is smaller than the preset reference value. When the frequency change rate of the received carrier is changed from the first section to the second section, the frequency error compensation unit 130 may determine that the preset second criterion is satisfied. In this case, the frequency error compensation unit 130 may calculate the second frequency error prediction value by correcting the first frequency error prediction value by using a predefined function, and may compensate for the frequency of the carrier on the basis of the second frequency error prediction value.

More specifically, the second frequency error prediction value may be calculated by weighting the first frequency error prediction value, or may be calculated by taking an average of the frequency error detection value and the first frequency error prediction value. However, the second frequency error prediction value may be corrected by using other various techniques according to an environment in which the automatic frequency control device is used.

Further, when the frequency change rate of the received carrier does not satisfy the preset second criterion, the frequency error compensation unit 130 may compensate for the frequency of the carrier on the basis of the first frequency error prediction value calculated by using a predefined function.

Further, when the number of frequency error detection values is smaller than the number of variables of the algebraic function or the preset number of the transcendental function, the frequency error compensation unit 130 may compensate for the frequency of the carrier on the basis of the first frequency error prediction value calculated by using the interpolation method based on the frequency error detection value.

Figure 2:
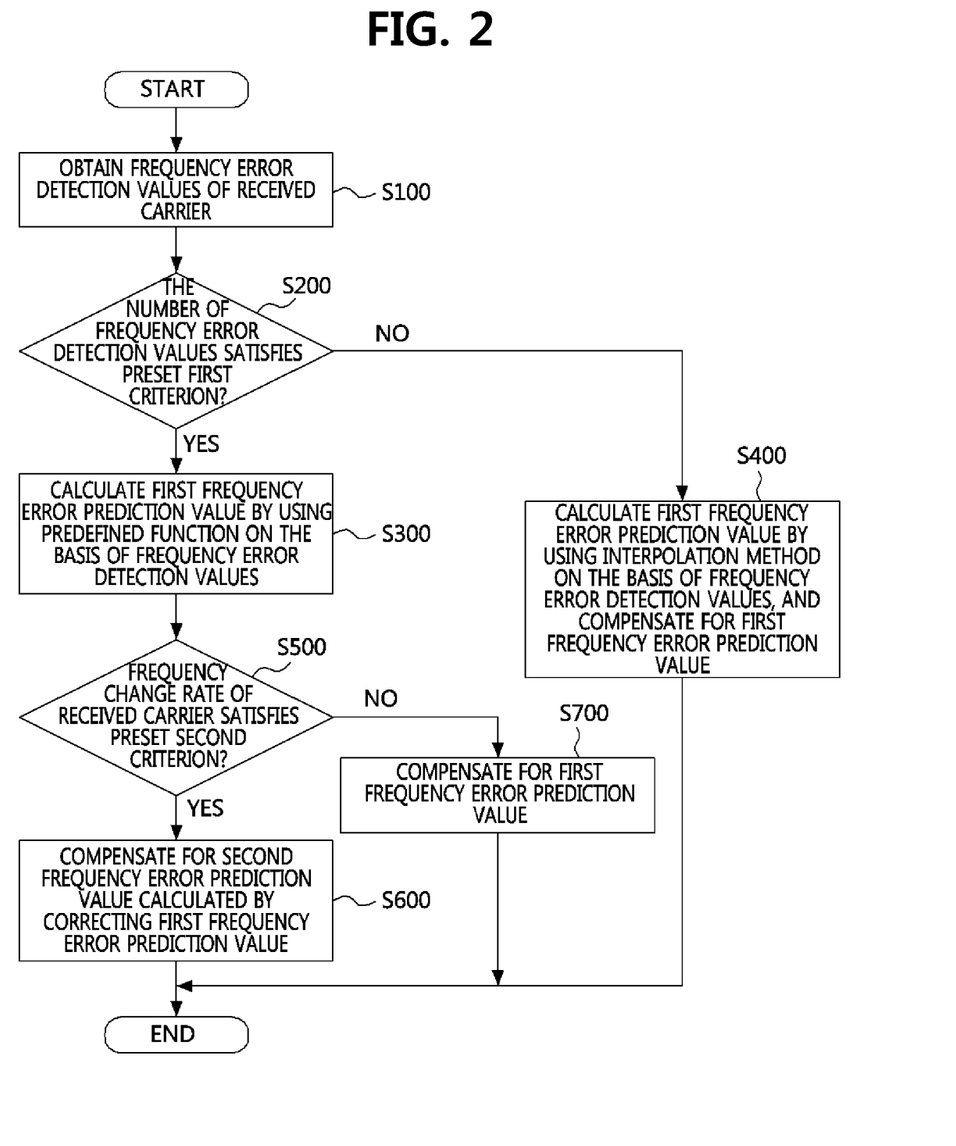
FIG. 2 is a flowchart illustrating a method for automatically controlling a frequency according to an example embodiment of the present invention.

FIG. 2 is a flowchart illustrating a method for automatically controlling frequency according to an example embodiment of the present invention.

Referring to FIG. 2, in the automatic frequency control method using the automatic frequency control device, a frequency error detection value of a received carrier may be obtained in operation S100, and it may be determined whether the frequency error detection value satisfies a preset first criterion in operation S200.

More specifically, in order to calculate a first frequency error prediction value in operation S200, the number of variables of an algebraic function may be compared with the number of frequency error detection values in the case where a predefined function is the algebraic function, or a preset number may be compared with the number of frequency error detection values in the case where the predefined function is a transcendental function.

Next, in operations S300 and S400, the first frequency error prediction value may be calculated on the basis of a result of operation S200.

More specifically, in the case where the number of frequency error detection values is equal to or greater than the number of variables of the algebraic function or the preset number of the transcendental function, the first frequency error prediction value may be calculated by using the predefined function on the basis of the frequency error detection value in operation S300. In the case where the number of frequency error detection values is smaller than the number of variables of the algebraic function or the preset number of the transcendental function, the first frequency error prediction value may be calculated by using an interpolation method on the basis of the frequency error detection value, and the frequency of the carrier may be compensated for on the basis of the calculated first frequency error prediction value in operation S400.

For example, in the case where the predefined function is an algebraic function of $y=ax^2+bx+c$, the number of variables (i.e., 'a', 'b', and 'c' in this example) is three. In this case, when the number of frequency error detection values is three or more, the first frequency error prediction value may be calculated by using the algebraic function with the frequency error detection values. However, when the number of frequency error detection values is two, the first frequency error prediction value cannot be calculated by using the algebraic function. Therefore, the interpolation method, e.g., a low-order linear interpolation method, may be used to calculate the first frequency error prediction value.

Further, in the case where the predefined function is a transcendental function such as $\cos(x)$, the preset number is compared with the number of frequency error detection values to calculate the frequency error prediction value by using the transcendental function when the number of frequency error detection values is equal to or greater than the preset number. Or, when the number of frequency error detection values is smaller than the preset number, the first frequency error prediction value may be calculated by using the interpolation method. Here, the preset number may be variously set according to a using environment.

Next, when the frequency change rate of the received carrier satisfies a preset second criterion, a second frequency error prediction value may be calculated by correcting the first frequency value prediction value, and the frequency of the carrier may be compensated for on the basis of the calculated second frequency error prediction value in operations S500, S600, and S700.

More specifically, in operation S500, the frequency change rate may be divided into a first section in which the frequency change rate is equal to or greater than a preset reference value (see FIG. 3), and a second section in which the frequency change rate is smaller than the preset reference value, and when the frequency change rate of the received carrier is changed from the first section to the second section, it may be determined that the preset second criterion is satisfied.

Further, in the case where it is determined that the frequency change rate of the received carrier satisfies the preset second criterion in operation S500, the second frequency error prediction value may be calculated by correcting the first frequency value prediction value calculated by using the predefined function, and the frequency of the carrier may be compensated for on the basis of the calculated second frequency error prediction value in operation S600.

More specifically, the second frequency error prediction value may be calculated by weighting the first frequency error prediction value, or may be calculated by taking an average of the frequency error detection value and the first frequency error prediction value. However, the second frequency error prediction value may be variously set according to an environment in which the automatic frequency control method is used.

Further, in the case where it is determined that the frequency change rate of the received carrier does not satisfy the preset second criterion in operation S500, the frequency of the carrier may be compensated for on the basis of the first frequency error prediction value calculated by using the predefined function.

Figure 3:
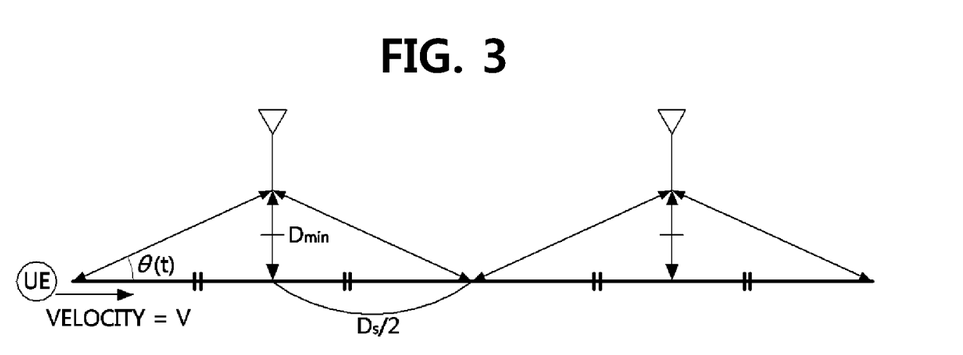
FIG. 3 is a conceptual diagram illustrating a high speed train condition of an LTE system, in which the automatic control device and method according to example embodiments of the present invention may be used, to show a method for setting a reference value for dividing the first and second sections of FIGS. 1 and 2.

FIG. 3 is a conceptual diagram illustrating a high speed train condition of an LTE system, in which the automatic control device and method according to example embodiments of the present invention may be used. More specifically, FIG. 3 illustrates a method for setting the reference value for dividing the first and second sections described above in connection with FIGS. 1 and 2.

Referring to FIG. 3, frequency characteristics of a carrier with consideration of a Doppler shift phenomenon in a line-of-sight condition on a non-fading channel, i.e., the high speed train condition, may be expressed as Equation 1 below:

$$f_s(t)=f_{dmax}\cdot\cos\theta(t) \qquad \text{[Equation 1]}$$

In Equation 1, $f_s(t)$ denotes a frequency of a received carrier with consideration of the Doppler shift, $f_{dmax}$ denotes a Doppler frequency, and $\theta(t)$ denotes an angle of receiving, in a mobile terminal UE, a carrier transmitted from a transmitter.

The Doppler frequency $f_{dmax}$ may be expressed as Equation 2 below:

$$f_{dmax}=\frac{v\cdot f_c}{C} \qquad \text{[Equation 2]}$$

In Equation 2, v denotes a moving velocity of the mobile terminal UE, $f_c$ denotes a frequency of a carrier transmitted from a transmitter, and C denotes a wave velocity (the velocity of light in the case of a vacuum medium).

By substituting Equation 1 with Equation 2, Equation 3 may be obtained as below:

$$\cos\theta(t) = \begin{cases} \dfrac{D_s/2 - v \cdot t}{\sqrt{D_{min}^2 + (D_s/2 - v \cdot t)^2}}, & 0 \le t \le \dfrac{D_s}{v} \\ \dfrac{-1.5 D_s + v \cdot t}{\sqrt{D_{min}^2 + (-1.5 D_s + v \cdot t)^2}}, & \dfrac{D_s}{v} < t \le \dfrac{2D_s}{v} \\ \cos\theta(t \bmod (2D_s/v)), & t > \dfrac{2D_s}{v} \end{cases} \quad \text{[Equation 3]}$$

From Equation 3, it may be understood that the frequency of the received carrier is most rapidly changed when $t=D_s/2\,v$ or $t=3D_s/2\,v$, and may be ignored when $t>2D_s/v$. Thus, $\cos\theta(t)$ may approximate to Equation 4 below:

$$\cos\theta(t) \approx \begin{cases} \dfrac{D_s/2 - v \cdot t}{D_{min}}, & 0 \le t \le \dfrac{D_s}{v} \\ \dfrac{-1.5 D_s + v \cdot t}{D_{min}}, & \dfrac{D_s}{v} < t \le \dfrac{2D_s}{v} \end{cases} \quad \text{[Equation 4]}$$

By substituting Equation 1 with Equation 4 and by differentiating Equation 1, a frequency change rate of the received carrier may be expressed as Equation 5 below:

$$f_s'(t) \approx \begin{cases} -\dfrac{v^2 f_c}{cD_{min}}, & 0 \le t \le \dfrac{D_s}{v} \\ \dfrac{v^2 f_c}{cD_{min}}, & \dfrac{D_s}{v} < t \le \dfrac{2D_s}{v} \end{cases} \quad \text{[Equation 5]}$$

In Equation 5, $f_c$ denotes the frequency of the carrier transmitted from the transmitter, which is already known to the mobile terminal UE by conducting a cell search, C denotes a wave velocity, v denotes a moving velocity of the mobile terminal, and $D_{min}$ denotes the shortest distance between the transmitter and the mobile terminal. In Equation 5, the frequency $f_c$ of the transmitted carrier, the wave velocity C, and the shortest distance $D_{min}$ between the transmitter and the terminal are constants, and the velocity v of the mobile terminal UE is a variable.

For example, when it is assumed that $f_c=2.7$ GHz, v=350 km/h, $D_{min}=2$ m, and $D_s=300$ m, the largest value among the frequency change rates of the received carrier is about 42.535 KHz/s. When it is assumed that the frequency change rate of the received carrier is maintained for about 1 ms which is a minimal frequency control period, the frequency change rate of the carrier received during a frequency control period is about 42.535 Hz/ms, and thus a range of the frequency change rate of the received carrier may be determined.

Therefore, the reference value for differentiating the first and second sections may be determined within the range of the frequency change rate of the received carrier. Further, as described above, the reference value is affected by the values in Equation 5, i.e., the moving velocity v of the mobile terminal, the shortest distance $D_{min}$ between the transmitter and the mobile terminal, the frequency $f_c$ of the carrier transmitted from the transmitter, and the wave velocity C. Therefore, the reference value may be variously set according to the environment in which the automatic frequency control device and method are used.

Figure 4:
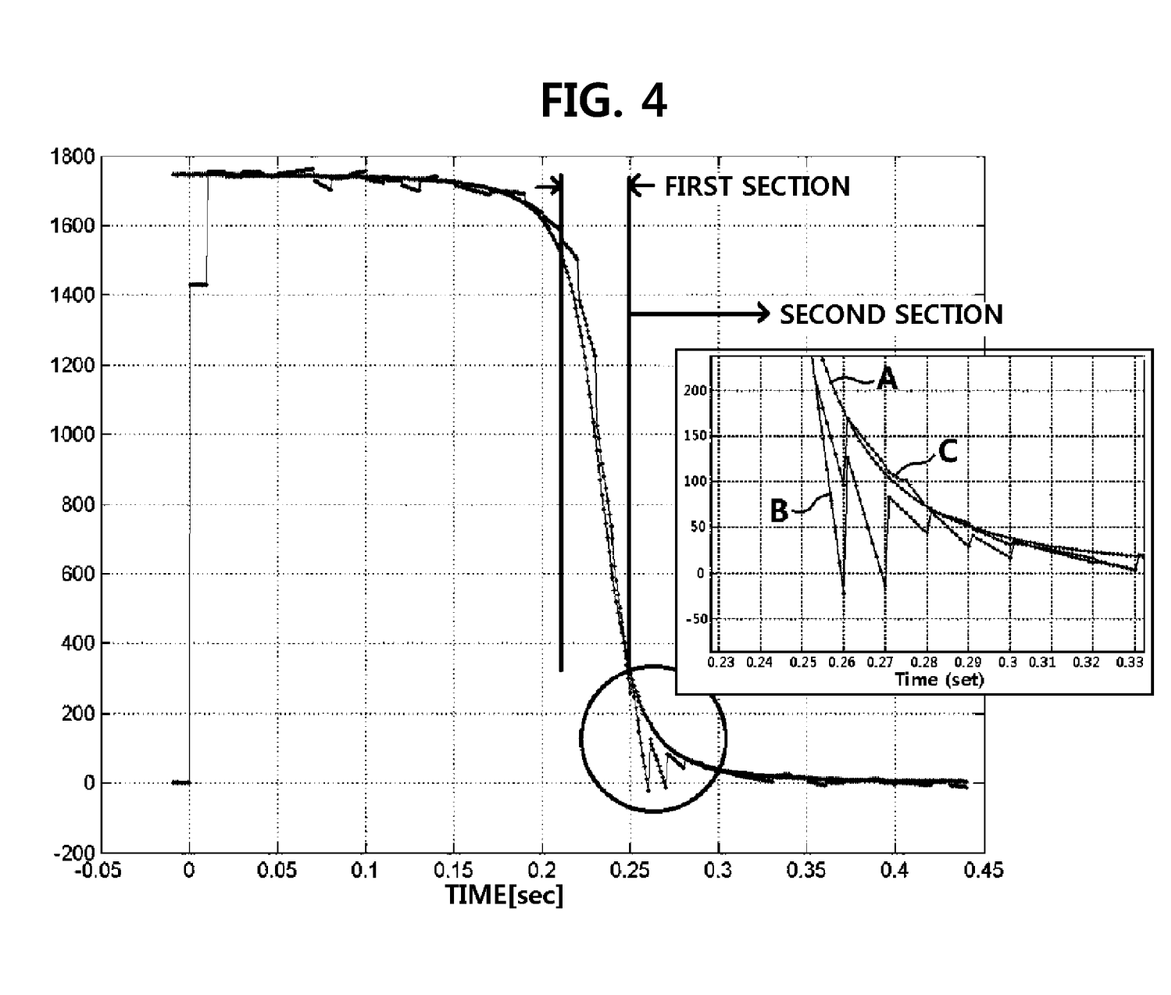
FIG. 4 is a time-frequency graph illustrating frequencies of a carrier in the case of compensating for a frequency error prediction value by using the automatic frequency control device and method according to example embodiments of the present invention.

FIG. 4 is a time-frequency graph illustrating frequencies of a carrier in the case of compensating for the frequency error prediction value by using the automatic frequency control device and method according to example embodiments of the present invention.

Referring to FIG. 4, the time-frequency graph illustrates a frequency A of a carrier transmitted from a transmitter, a frequency B of the carrier which is measured at a receiver in the case where the automatic frequency control device and method are not used, and a frequency C of the carrier which is measured at the receiver in the case where the automatic frequency control device and method are used.

Further, the time-frequency graph illustrates the first section in which the frequency change rate of the received carrier is equal to or greater than the preset reference value, and the second section in which the frequency change rate is smaller than the preset reference value.

Further, the first section in which the frequency change rate of the received carrier is rapidly changed is not greater than about 30 ms. Therefore, the first section may be set as a section in which the frequency change rate of the received carrier is kept higher than the preset reference value for about 20 ms or more.

Further, it is shown in the time-frequency graph that an undershoot phenomenon, which occurs when the frequency change rate of the received carrier is changed from the first section to the second section, is reduced when the automatic frequency control device and method are used.

According to the above-described automatic frequency control device and method, the second frequency error prediction value can be calculated by correcting the first frequency error prediction value when the frequency change rate of the received carrier changes from a high value to a low value, and the frequency of the carrier can be compensated for on the basis of the calculated second frequency error prediction value.

Therefore, the effects of the overshoot and undershoot phenomena, which occur when the frequency change rate changes from a high value to a low value, can be minimized, and thus frequency control can be performed more correctly.

Further, according to the automatic frequency control device and method, since frequency control can be correctly performed, noise occurrence in a packet can be reduced, thereby reducing retransmission frequency of a packet.

While the example embodiments of the present invention and their advantages have been described in detail, it should be understood that various changes, substitutions and alterations may be made herein without departing from the scope of the invention.

What is claimed is:

1. An automatic frequency control device comprising:
   a frequency error detection unit configured to obtain frequency error detection values of a received carrier;
   a frequency error prediction unit configured to calculate a first frequency error prediction value using a first pre-defined function on the basis of the frequency error detection values when the frequency error detection values satisfy a preset first criterion; and
   a frequency error compensation unit configured to calculate a second frequency error prediction value using a second pre-defined function by correcting the first frequency error prediction value, and compensate for a frequency of the carrier on the basis of the second frequency error prediction value when a frequency change rate of the received carrier satisfies a preset second criterion,
   wherein the first pre-defined function and the second pre-defined function are different from each other.

2. The automatic frequency control device of claim 1, wherein the frequency error prediction unit compares the number of variables of an algebraic function with the number of frequency error detection values in the case where a predefined function for calculating the first frequency error prediction value is the algebraic function, or compares a preset number with the number of frequency error detection values in the case where the predefined function is a transcendental function to thereby calculate the first frequency error prediction value.

3. The automatic frequency control device of claim 2, wherein the frequency error prediction unit calculates the first frequency error prediction value by using the predefined function on the basis of the frequency error detection values when the number of frequency error detection values is equal to or greater than the number of variables or the preset number.

4. The automatic frequency control device of claim 2, wherein
the frequency error prediction unit calculates the first frequency error prediction value by using an interpolation method on the basis of the frequency error detection values when the number of frequency error detection values is smaller than the number of variables or the preset number, and
the frequency error compensation unit compensates for the frequency of the carrier on the basis of the first frequency error prediction value calculated by using the interpolation method.

5. The automatic frequency control device of claim 1, wherein the frequency error compensation unit divides the frequency change rate of the received carrier into a first interval in which the frequency change rate is equal to or greater than a preset reference value, and a second interval in which the frequency change rate is smaller than the preset reference value, wherein, when the frequency change rate of the received carrier is changed from the first interal to the second interval, the preset second criterion is satisfied.

6. The automatic frequency control device of claim 3, wherein, when the preset second criterion is satisfied, the frequency error compensation unit calculates the second frequency error prediction value by correcting the first frequency error prediction value calculated by using the predefined function, and compensates for the frequency of the carrier on the basis of the calculated second frequency error prediction value.

7. The automatic frequency control device of claim 3, wherein, when the preset second criterion is not satisfied, the frequency error compensation unit compensates for the frequency of the carrier on the basis of the first frequency error prediction value calculated by using the predefined function.

8. The automatic frequency control device of claim 1, wherein the frequency error compensation unit calculates the second frequency error prediction value by weighting the first error prediction value, or calculates the second frequency error prediction value by taking an average of the frequency error detection values and the first frequency error prediction value.

9. An automatic frequency control method using an automatic frequency control device, the method comprising:
obtaining frequency error detection values of a received carrier;
calculating a first frequency error prediction value using a first pre-defined function on the basis of the frequency error detection values when the frequency error detection values satisfy a preset first criterion; and
calculating a second frequency error prediction value using a second pre-defined function by correcting the first frequency error prediction value, and compensating for a frequency of the carrier on the basis of the second frequency error prediction value when a frequency change rate of the received carrier satisfies a preset second criterion,
wherein the first pre-defined function and the second pre-defined function are different from each other.

10. The automatic frequency control method of claim 9, wherein the calculating of the first frequency error prediction value comprises comparing the number of variables of an algebraic function with the number of frequency error detection values in the case where a predefined function for calculating the first frequency error prediction value is the algebraic function, or comparing a preset number with the number of frequency error detection values in the case where the predefined function is a transcendental function to thereby calculate the first frequency error prediction value.

11. The automatic frequency control method of claim 10, wherein
the calculating of the first frequency error prediction value comprises calculating the first frequency error prediction value by using the predefined function on the basis of the frequency error detection values when the number of frequency error detection values is equal to or greater than the number of variables or the preset number, and
the calculating of the second frequency error prediction value and the compensating for the frequency of the carrier comprise calculating the second frequency error prediction value by correcting the first frequency error prediction value calculated by using the predefined function, and compensating for the frequency of the carrier on the basis of the calculated second frequency error prediction value.

12. The automatic frequency control method of claim 10, wherein
the calculating of the first frequency error prediction value comprises calculating the first frequency error prediction value by using an interpolation method on the basis of the frequency error detection values when the number of frequency error detection values is smaller than the number of variables or the preset number, and
the calculating of the second frequency error prediction value and the compensating for the frequency of the carrier comprise compensating for the frequency of the carrier on the basis of the first frequency error prediction value calculated by using the interpolation method.

13. The automatic frequency control method of claim 9, wherein the calculating of the second frequency error prediction value and the compensating for the frequency of the carrier comprise dividing the frequency change rate of the received carrier into a first interval in which the frequency change rate is equal to or greater than a preset reference value, and a second interval in which the frequency change rate is smaller than the preset reference value, wherein, when the frequency change rate of the received carrier is changed from the first interval to the second interval, the preset second criterion is satisfied.

14. The automatic frequency control method of claim 11, wherein the calculating of the second frequency error prediction value and the compensating for the frequency of the carrier comprise compensating for the frequency of the carrier on the basis of the first frequency error prediction value calculated by using the predefined function when the preset second criterion is not satisfied.

15. The automatic frequency control method of claim 9, wherein the calculating of the second frequency error prediction value and the compensating for the frequency of the carrier comprise calculating the second frequency error prediction value by weighting the first error prediction value, or calculating the second frequency error prediction value by taking an average of the frequency error detection values and the first frequency error prediction value.

\* \* \* \* \*